(12) United States Patent
Elmer

(10) Patent No.: US 10,930,067 B2
(45) Date of Patent: Feb. 23, 2021

(54) TOOL FOR SHARED ENGINEERING MESH-RUN INTEGRATION WITH VERSION EVOLUTION TRACKING

(71) Applicant: Lawrence Livermore National Security, LLC, Livermore, CA (US)

(72) Inventor: William Elmer, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 827 days.

(21) Appl. No.: 15/597,839

(22) Filed: May 17, 2017

(65) Prior Publication Data
US 2018/0336723 A1 Nov. 22, 2018

(51) Int. Cl.
| | |
|---|---|
| *G06T 17/20* | (2006.01) |
| *G06F 3/023* | (2006.01) |
| *G06F 8/71* | (2018.01) |
| *G06F 16/958* | (2019.01) |
| *G06T 17/00* | (2006.01) |
| *G06F 30/17* | (2020.01) |

(Continued)

(52) U.S. Cl.
CPC .............. *G06T 17/20* (2013.01); *G06F 3/023* (2013.01); *G06F 8/71* (2013.01); *G06F 16/972* (2019.01);
(Continued)

(58) Field of Classification Search
CPC ......... G06T 17/20; G06T 17/00; G06T 17/10; G06F 30/17; G06F 30/20; G06F 30/23;
(Continued)

(56) References Cited

U.S. PATENT DOCUMENTS

| | | |
|---|---|---|
| 5,768,156 A | 6/1998 | Tautges et al. |
| 6,970,165 B2 | 11/2005 | Wollny et al. |

(Continued)

OTHER PUBLICATIONS

Tata Technologies webpage on Simcenter Products, https://www.tatatechnologies.com/us/technology/siemens/simcenter, at least one day prior to May 17, 2017, 2 pp.

(Continued)

*Primary Examiner* — Saif A Alhija
(74) *Attorney, Agent, or Firm* — Harness, Dickey & Pierce, P.L.C.

(57) ABSTRACT

The physical object design and manufacture tool employs a processor programmed to parse user-supplied instructions expressed as text statements according to a predefined syntax and grammar. The processor interfaces with a graphical mesh creation tool that that expresses object geometry according to a predefined data model and that produces a graphical rendering of an object in accordance with the data model. The processor also interfaces with a computer-implemented analysis system that responds to predefined analysis code instructions and generates a simulation output stored in a file system associated with the analysis system. The processor is further interfaced with a version control repository system. The processor translates user-supplied instructions into designated analysis code that it submits to the analysis system as a job to be run. The processor causes the version control repository system to capture a state of the user-supplied instructions and generates an identifier or hash code that it uses to tag the file where the simulation output is stored.

19 Claims, 6 Drawing Sheets

(51) Int. Cl.
*G06F 30/20* (2020.01)
*G06F 30/23* (2020.01)
*G06T 17/10* (2006.01)
*G01V 99/00* (2009.01)
*G06F 111/02* (2020.01)
*G06F 40/12* (2020.01)

(52) U.S. Cl.
CPC .............. *G06F 30/17* (2020.01); *G06F 30/20* (2020.01); *G06F 30/23* (2020.01); *G06T 17/00* (2013.01); *G01V 99/005* (2013.01); *G06F 40/12* (2020.01); *G06F 2111/02* (2020.01); *G06T 17/10* (2013.01)

(58) Field of Classification Search
CPC .......... G06F 16/972; G06F 3/023; G06F 8/71; G06F 40/12; G06F 2111/02; G01V 99/005
See application file for complete search history.

(56) References Cited

U.S. PATENT DOCUMENTS

| | | | | |
|---|---|---|---|---|
| 2003/0046061 A1* | 3/2003 | Preston | ................... | G06F 8/30 704/9 |
| 2004/0107019 A1* | 6/2004 | Keshavmurthy | .. | G05B 19/4097 700/118 |
| 2013/0144566 A1* | 6/2013 | De Biswas | .......... | G06Q 10/101 703/1 |

OTHER PUBLICATIONS

Siemens webpage on simulation test management program, https://www.plm.automation.siemens.com/global/en/products/collaboration/simulation-test-management.html, at least one day prior to May 17, 2017, 3 pp.

Engelman, Michael, "Getting Connected", ANSYS Advantage, https://www.ansys.com/products/platform/ansys-ekm, 2010, 1 p.

Dassault Systemes webpage on 3Ds Enterprise Project Management, https://www.3ds.com/industries/life-sciences/business-processes/enterprise-project-management, at least one day prior to May 17, 2017, 4 pp.

PTC webpage on Windchill, https://www.ptc.com/en/producs/plm-products/windchill, at least one day prior to May 17, 2017, 6 pp.

Atlassian JIRA webpage on product management, https://www.atlassian.com/agile/product-management, at least one day prior to May 17, 2019, 11 pp.

Slack webpage on directory of project management, https://slack.com/apps/category/At0EFY3MJ4-project-management, at least one day prior to May 17, 2017, 3 pp.

* cited by examiner

TOOL FOR SHARED ENGINEERING MESH-RUN INTEGRATION WITH VERSION EVOLUTION TRACKING

FIELD

The disclosure relates generally to tools for designing and manufacturing physical objects. More particularly the disclosure relates to a tool to allow a group of design engineers to collaborate on the design and manufacture of a physical object. The tool expresses physical object parameters and test simulation regimen in an object-oriented textual expression, allowing general purpose software development tools to be used in the engineering collaboration.

BACKGROUND

The software development industry enjoys a number of coding, version tracking, debugging and team management tools. Such tools are used to help large software companies maintain their burgeoning codebase. To illustrate, in 2015, it was estimated that the Google codebase spans 2 billion lines of code, stored in 1 billion files requiring 86 terabytes of storage. The Google codebase is no doubt much larger today. A codebase of this size is manageable only through the use of group collaboration tools and rigorous software version control systems.

In contrast to the software development industry, the physical part manufacturing industry is currently unable to take advantage of these empowering collaboration tools and version control systems. While modern day computer aided design (CAD) systems and mesh modeling systems provide manufacturing engineers with rudimentary collaboration tools, these are largely closed systems that are incapable of interfacing with the more robust systems enjoyed by software engineers.

There has heretofore been no practical way of adapting existing manufacturing systems to offer the rich assortment of collaboration tools used in the software industry. Likewise there has been no practical way of interfacing existing manufacturing systems to the collaboration tools enjoyed by the software industry.

SUMMARY

The disclosed technology addresses this significant shortcoming of current tools for designing and manufacturing physical parts. As more fully set forth herein, the disclosed design and manufacturing tool provides manufacturing engineers with an enabling platform that encourages innovative development and multidisciplinary team formation. Using the disclosed tool engineers can collaborate and manage product development from the early design concept phase, through the problem decomposition and redesign phase, through the design review and simulation testing phase, all the way to launching the physical product to market. As used herein the disclosed tool for design and manufacturing of physical parts is referred to as the Simrev tool comprising among other components, a specially programmed computer or processor referred to as the Simrev processor.

The Simrev tool provides a way to map a real, physical object—like an airplane, a building, or a smartphone—to software that predicts its fitness and guides its design. While the contemporary real product engineering process, involving complicated assemblies of parts, has been integrated with Computer Aided Design (CAD) technology for some time. The Simrev processor provides a framework around CAD and finite Element Analysis (FEA) technology which allows the evolution of a real product design to follow the same norms and use the same collaboration technologies as software development. The Simrev tool provides an interface to FEA tools, running on supercomputers, that can answer questions about how a real item will behave subject to shock, heat, or other combinations of stressing use cases. Product design and engineering is thereby made equivalent to software development of a python program utilizing the Simrev library. As the design of the real item progresses, the software that the Simrev processor supports becomes more complex, and the answers provided by the simulation tools become more relevant and predictive.

According to one aspect, the disclosed computer-implemented tool for design of a physical object employs a processor programmed to parse user-supplied instructions expressed as text statements according to a predefined syntax and grammar. The processor is programmed to define a first interface to a graphical mesh creation tool that that expresses object geometry according to a predefined data model and that produces a graphical rendering of an object in accordance with the data model. The processor is further programmed to define a second interface to a computer-implemented analysis system of the type that responds to predefined analysis code instructions and that generates a simulation output stored in a file system associated with the analysis system. Additionally, the processor is programmed to define a third interface to a computer-implemented version control repository system. The processor is programmed to translate at least one of the parsed user-supplied instructions into a physical object geometry specification expressed using the data model. The processor is programmed (a) to translate at least one of the parsed user-supplied instructions into designated analysis code instructions, (b) to submit the designated analysis code instructions to the analysis system as a job to be run on the analysis system and (c) to cause the file system associated with the analysis system to allocate a file on said file system in which to store output of an analysis performed by the analysis system using the designated analysis code. The processor is programmed to cause the version control repository system to capture a state of the user-supplied instructions, to generate an identifier based on the captured state and to associate the identifier with the allocated file on the file system associated with the analysis system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Corresponding reference numerals indicate corresponding parts throughout the several views of the drawings.

DESCRIPTION OF PREFERRED EMBODIMENTS

Overview

Figure 1:
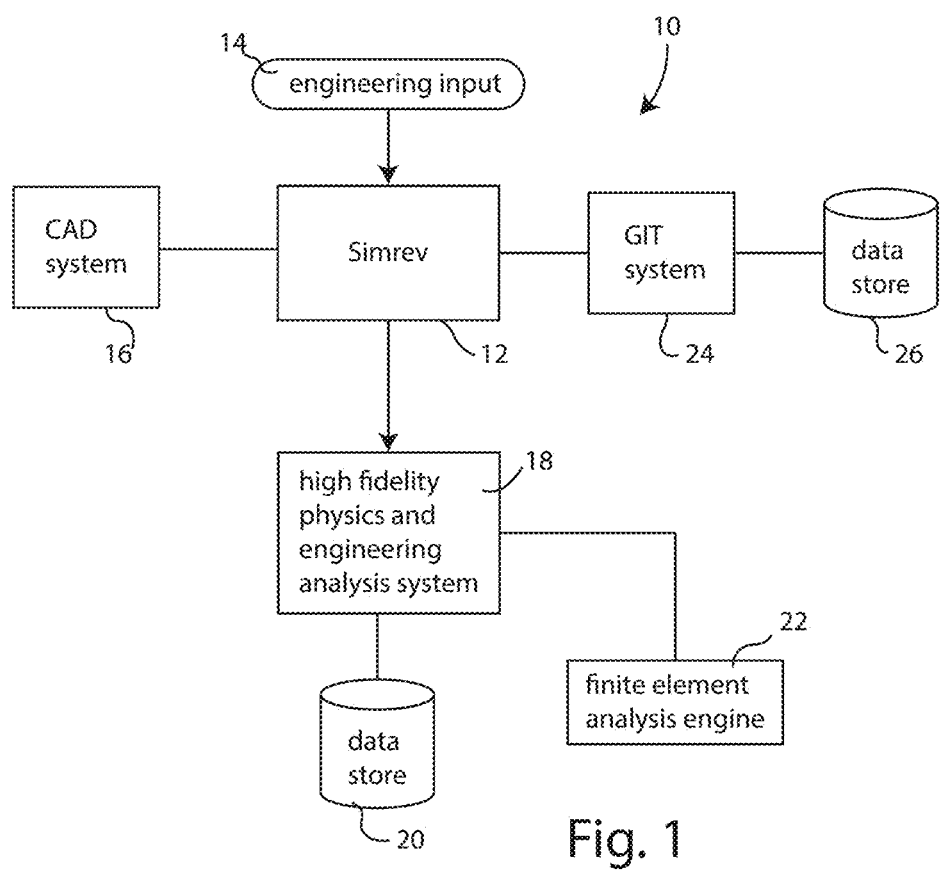
FIG. 1 is a block diagram of the Simrev tool deployed in an exemplary environment in which the tool is interfaced with an exemplary CAD system, a GIT version control system and a hi fidelity physics and engineering analysis system.

In one embodiment the Simrev tool is implemented as a Python package that contains tools product engineers can use to build special purpose computer programs that describe in great detail not only the physical product being developed but also the simulation tests and analyses to be run against that product. In the Python implementation, the Simrev library plays a role in defining the main program ("main.py"). When run from the command line of the host computer, the main program performs tasks associated with one of three outcomes which are mapped to three buttons on the Simrev Graphical User Interface (GUI). The tasks are: regenerate assembly parts; review materials, boundary conditions, and contact interfaces in the GUI version of Cubit; or run the analysis.

Running the analysis prepares one or more input files for a high-fidelity physics and engineering analysis system (e.g., Paradyn, ALE3D, Diablo, or NIKE3D), typically run on a supercomputer. The Simrev processor submits a command to a batch scheduling system for the supercomputing infrastructure on which the high fidelity system is run.

The main program (main.py) is version controlled by a software version control tool such as GIT. Running the analysis will prepare the input data in a specific location derived from the current repository commit, on a massively parallel distributed file system of the supercomputer (e.g., the Lustre file system). If desired the files may be saved in scratch directories that may be periodically purged to recapture storage space. Should such a purge occur, the data may be regenerated from a commit in the version control system. The input data are usually a very large text file, or a smaller text file combined with binary geometry data (in an Exodus format used by the Exodus, or NetCDF, finite element analysis input data format), depending on the analysis code being run.

Once a batch processing job is submitted and that analysis is performed on thousands of processor cores running the finite element analysis software, the amount of data explodes into a very large collection of field variables, representing physical factors like stress and strain, calculated at every location in the specified geometry and (typically for explicit calculations) plotted at a large number of time steps. Using its connection to the version control system, the Simrev processor provides an audit trail for every change that is made to the model and a perfect 1-to-1 map between the simulation code and a cryptographic hash of the source code, which is a very small piece of information (40 characters) but nonetheless extraordinarily unique.

Exemplary Embodiment

To illustrate the principles of the disclosed technology, an exemplary manufacturing project has been chosen, specifically the project of manufacturing a small piston driven engine having a small assortment of meshing gears. It will be understood that this is merely an example, intended to illustrate how the disclosed design and manufacturing tool works. The disclosed tool is capable of handling design and manufacturing across a wide spectrum of products. Thus, while the exemplary embodiment employs physical modeling algorithms to reflect physical component fit and thermodynamic properties of the materials used, other embodiments are envisioned that take other factors into account, such as: spacecraft trajectory, reentry heating, structural margin, or mass closure; shock and vibration environment on a consumer product (e.g. smartphone); crashworthiness assessment, and drag or fuel efficiency calculations from fluid dynamics of vehicles; and earthquake engineering of high-rise structures.

The disclosed embodiment utilizes the object-oriented text-based coding language Python as a presently preferred implementation. It will be understood that the principles of the disclosed technology can be met using other coding languages.

The disclosed embodiment illustrates how the design and manufacturing tool can be made to interface with commercially available CAD systems, GIT version control systems, CUBIT graphical meshing systems and several powerful modeling systems (e.g., ALE3D, Paradyn, NIKE3D, Diablo). It will be understood that these systems have been chosen merely to illustrate how the tool can be configured and deployed. Use with other systems is envisioned.

Referring first to FIG. 1, the basic design and manufacturing tool 10 includes the Simrev processor 12 which will be described more fully below. Simrev processor 12 may be implemented on a suitably programmed computer running an operating system such as LINUX. Other operating systems can also be used. The Simrev processor 12 is specifically programmed to represent part descriptions, simulation input deck options, boundary conditions, constitutive material parameters and part interfaces using an object-oriented text based language. The processor provides a user interface 14 through which select engineering input, e.g. part names and the state of the underlying source code, is rendered and changes in part descriptions disseminated through the version control system (or enterprise management solution) are highlighted, to emphasize the changes occurring in the text based language. In the embodiment featured here the Simrev processor 12 is based on the Python language, although other languages are also possible.

The Simrev processor performs several design and manufacturing tasks and provides several interfaces to other processor-based systems that assist in performing these tasks. For some product design applications, certain part geometry data may be available by importing from a computer aided design or CAD system 16. The CAD system is optional, however, as the Simrev processor is capable of generating part descriptions based on engineering input encoded in the source code and passed to the CUBIT interface 90.

A key function of the Simrev processor is to provide detailed and explicit instructions to a processor-based high fidelity physics and/or engineering analysis system 18. These instructions are provided in the form of computer code expressed in the native language of the high fidelity analysis system. Typically these high fidelity analysis systems will be implemented using one or more high speed supercomputers that store their output files in a parallel data store system, illustrated diagrammatically at 20. The particular programming of the high speed super computer(s) will depend on the application at hand. Examples include ALE3D, available from Lawrence Livermore National Laboratories, Diablo, available from Lawrence Livermore National Laboratories, NIKE3D available from Lawrence Livermore National Laboratories and Paradyn, available from Lawrence Livermore National Laboratories. ALE3D and Paradyn are examples of systems that are designed to analyze rapidly changing events (e.g., explosions, vehicle crashes, etc.); Diablo and NIKE3D are examples systems designed to handle systems where changes happen over longer periods of time with implicit time stepping (e.g., stress and strain analysis, heat transfer, etc.). While the particular functionality of the high fidelity analysis system 18 will depend on the task requirements, typically these high fidelity analysis systems include a finite element analysis engine 22. While a high speed supercomputer has been described herein, those of skill in the art will appreciate that the computing power of the high fidelity analysis system will depend on the requirements of the analysis being conducted. Thus a supercomputer may not be needed in all applications, in which case a less powerful computer or computer system may be utilized. For example a cluster of distributed computers can be used, where results are merged using a distributed file system.

The Simrev processor is designed to convert the object-oriented, text-based engineering input into commands that can be used to generate computer model representations of all parts, including both individual part details and assembly details that are then manipulated by the high fidelity physics and engineering analysis system 18 to perform a battery of simulation tests that are also based on user supplied (object-oriented, text-based) instructions.

Mediation by Version Control and Integration with Supercomputer

To allow for teams of engineers to collaborate on the product design, the Simrev processor assures that the version control system keeps accurate record of each and every change that is made to a product design, from the very first part specified to the final finished assembly. To manage these accurate records, the Simrev processor is coupled to a software version control system, illustrated here as GIT system 24. Associated with GIT system 24 is a data store 26 where version control records are stored. The Simrev processor instructs the GIT system to calculate a hash (a unique numeric or alphanumeric representation) for each revision to the design that is studied by a member of the engineering team, i.e. when the analysis is run through the finite element processor. Commits of changes that have not been assessed are optional. When a team member submits a commit command to the GIT system via the LINUX operating system or the Simrev processor, signifying that the update should be recorded, a unique hash value is generated.

The Simrev processor causes the parallel file system 20 to append this unique hash tag to its file name designation or other part of the file data record corresponding to the simulation performed using this version of the updated design. In this way the Simrev system is able, not only to reconstitute the engineering design at any committed stage of completion, but also to identify the precise high fidelity output file previously generated for that stage of the design.

The Simrev Processor

The Simrev processor 12 is a special purpose computer that generates and stores recipes that are then compiled and used to generate the code instructions for the high fidelity analysis system. The Simrev processor 12 uses an object-oriented, text based language to express these recipes. As such the Simrev processor 12 is programmed to operate as a special purpose interpreter or compiler. In the presently preferred embodiment the Simrev processor is implemented as a Python interpreter-compiler.

Figure 2:
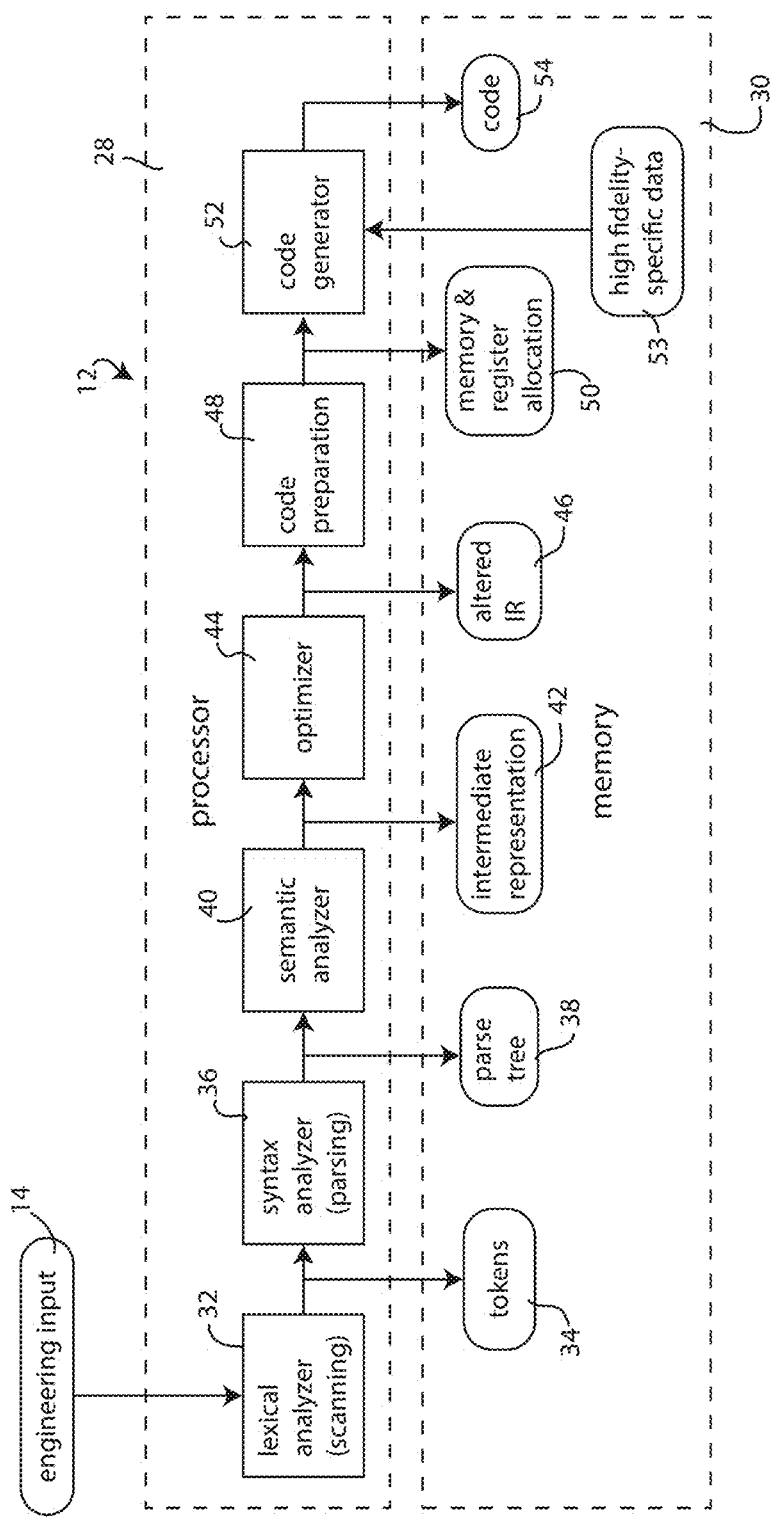
FIG. 2 is a hardware block diagram illustrating the general implementation of a processor-implemented interpreter-compiler useable in implementing the Simrev tool.

Illustrated in FIG. 2, the Simrev processor 12 implements an interpreter-compiler that runs as executable code on processor 28 and stores its intermediate and final output in the associated computer memory 30. The processor 28 is programmed to accept engineering input (e.g., via user interface 14) and scan this input in the lexical analyzer to convert the input into tokens 34 according to the lexical analyzer rules. These tokens 34 are then passed to the syntax analyzer 36 that parses the tokens into syntactical structures known as a parse tree 38. Next the semantic analyzer 40 operates on the parse tree to define an intermediate code representation 42 that may be optimized by optimizer code 44 to produce an altered intermediate representation 46. This altered intermediate representation is then fed to a code preparation engine 48 that determines how the altered intermediate representation is allocated to memory, with the results being stored at 50. The code generator 52 then produces the final output code 54 that corresponds to the form needed for the particular high fidelity analysis system for which the code is being compiled. Specifics about each different high fidelity analysis system are stored as data in memory at 53 and used during code generation.

The Python interpreter-compiler (or whatever language compiler has been chosen for the implementation) can be built upon a standard interpreter-compiler designed for the operating system being used on the computer system of choice. In the LINUX environment, for example, Python version 2.7.11 or greater can be used. Regardless of the computer platform and operating system chosen, the Simrev functionality is added to the standard interpreter-compiler as libraries that augment the core libraries of the interpreter-compiler. In the case of the Python implementation described here, these libraries contain a set of object-oriented Class definitions that provide the Simrev functionality and thereby adapt the general purpose computer to this special purpose and thus define the Simrev tool.

Simrev Class Libraries

Figure 3:
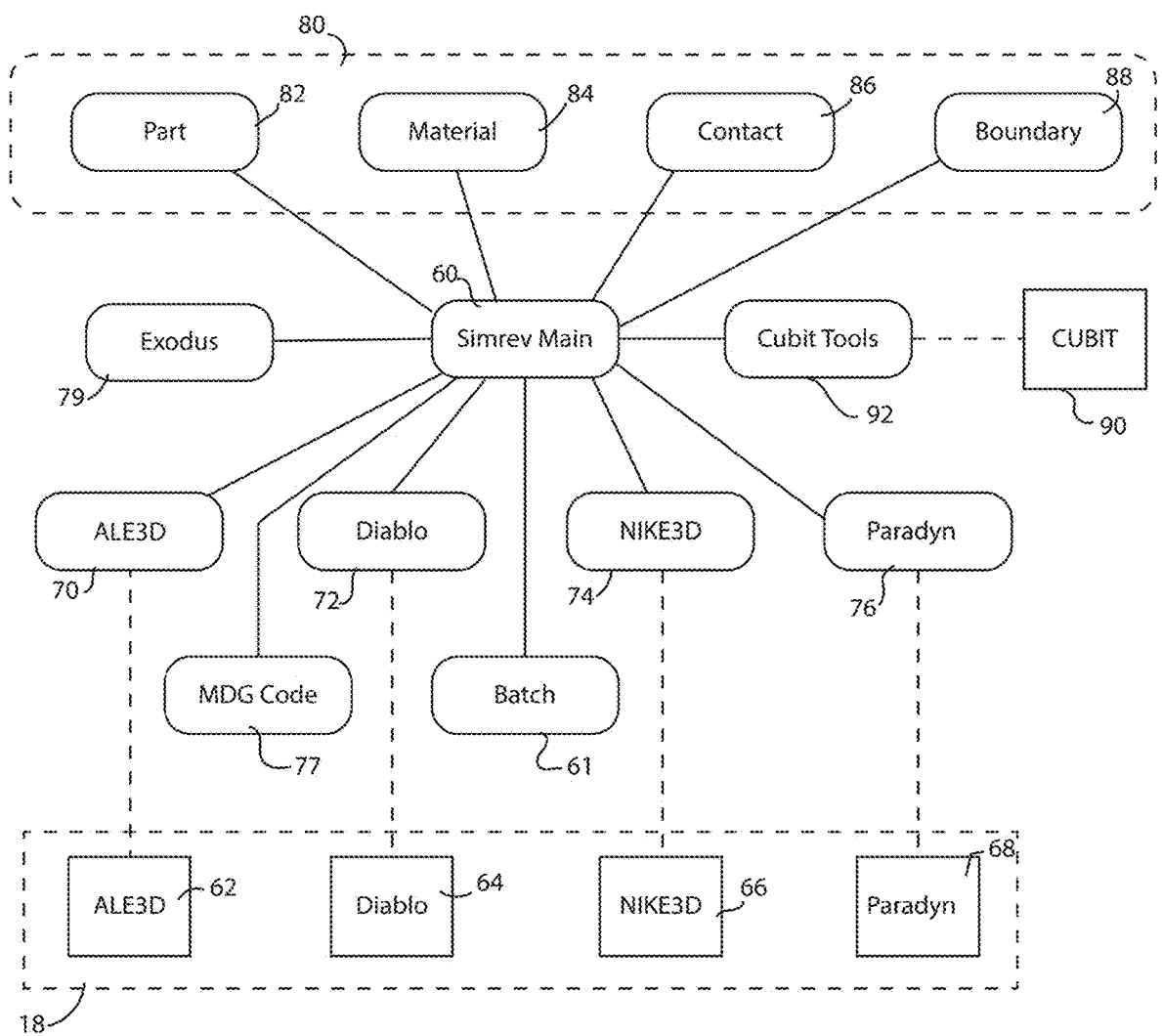
FIG. 3 is a software class diagram illustrating how the processor of FIG. 2 is programmed to implement the Simrev tool.

FIG. 3 provides a top level view of the architecture of the Class libraries of the illustrated embodiment. The Simrev Main module 60 contains objects needed to create and run an analysis in one of a selection of different high fidelity physics and engineering analysis systems 18. For illustration purposes, four such systems are shown, namely ALE3D 62, Diablo 64, NIKE3D 66 and Paradyn 68. These illustrated systems 18 are run on separate supercomputer platforms and are not considered part of the illustrated Class libraries. Other analysis systems may be substituted for these. Associated with each of the high fidelity systems 18 is a corresponding Class library component that the Simrev Main module calls upon to create an input deck for the analysis being performed by the high fidelity system 18. In FIG. 3, these input deck creation library components are illustrated at ALE3D 70, Diablo 72, NIKE3D 74 and Paradyn 76. In addition to these input deck creation library components, certain additional high fidelity system-specific library components may also included, as needed, to support system-specific interfacing requirements. Illustrated in FIG. 3 is the MDG Code module 77, available from Methods Development Group (MDG) helps support the interface to the high fidelity systems 18.

Communication with supercomputers can require special attention due to the massively parallel nature of the code that runs on those systems. These machines must be informed ahead of time how many resources (CPU-hours) should be dedicated to the finite element analysis. There are similarities in the interfacing requirements among many supercomputer-based high fidelity analysis systems. Thus the illustrated Class library embodiment includes a Batch module 61 to interact with the supercomputer system. The individual input deck creation library components (e.g. ALE3D 70, Diablo 72, NIKE3D 74 and Paradyn 76 can inherit from the Batch module and thereby gain the ability to communicate with the supercomputer.

The Class library also includes a set of several library modules that are used to describe the physical properties of the physical part being designed and manufactured. This set of library modules is shown generally at 80 and include the following:

- The Part module 82 holds information about physical objects and manages the mapping of Python code to the simulation of those objects.
- The Material module 84 defines materials and material related entities using module variables.
- The Contact module 86 defines interfaces, such as interfaces between parts. These interfaces can be tied—to attach parts that don't have coincident mesh, friction or some other code-specific type like the transmission of heat.
- The Boundary module 88 defines boundary and initial conditions on analyses to be performed by a high fidelity system. The Boundary module associates boundary conditions with geometric objects like volumes or surfaces. Boundary conditions can range from structural and thermo-mechanics, fluid mechanics, or handoffs of data between the two.

3D Rendering: While engineering input is provided to the Simrev processor using object-oriented, text-based lines of code (e.g. Python code), the presently preferred tool is also able to render the physical objects being designed and manufactured as three-dimensional graphically displayed objects. To provide this functionality the Simrev processor makes use of a graphical preprocessor tool. In the illustrated embodiment the CUBIT available from Sandia National Laboratories. The CUBIT tool is shown in FIG. 3 at 90. The Class library includes a Cubit Tools module 92 that provides the interface with the CUBIT tool 90. In some implementations, it can be helpful to manipulate data before it is sent to the CUBIT tool. The illustrated Exodus module 79 may be included to process blocks, nodesets and sidesets into the exodus file format before being exported to CUBIT. Materials must become blocks, and boundary conditions and interfaces are implemented as sidesets or nodesets depending on the high fidelity analysis tool used. The Exodus file format is used with the Exodus finite element data model developed by Sandia National Laboratories and is directly compatible with ALE3D and Diablo.

The illustrated embodiment supports the ability to model physical parts and assemblies made using those parts. Thus the Class libraries illustrated in FIG. 3 include Classes such as Part, Material, Contact, and Boundary to represent the key properties of physical parts. It will be appreciated that when modeling other types of systems, different Class libraries may be appropriate. For example, a Simrev system designed to model subatomic physics experiments might employ Classes to represent Particles; Quarks, Leptons, and Bosons.

User Interface

Figure 4:
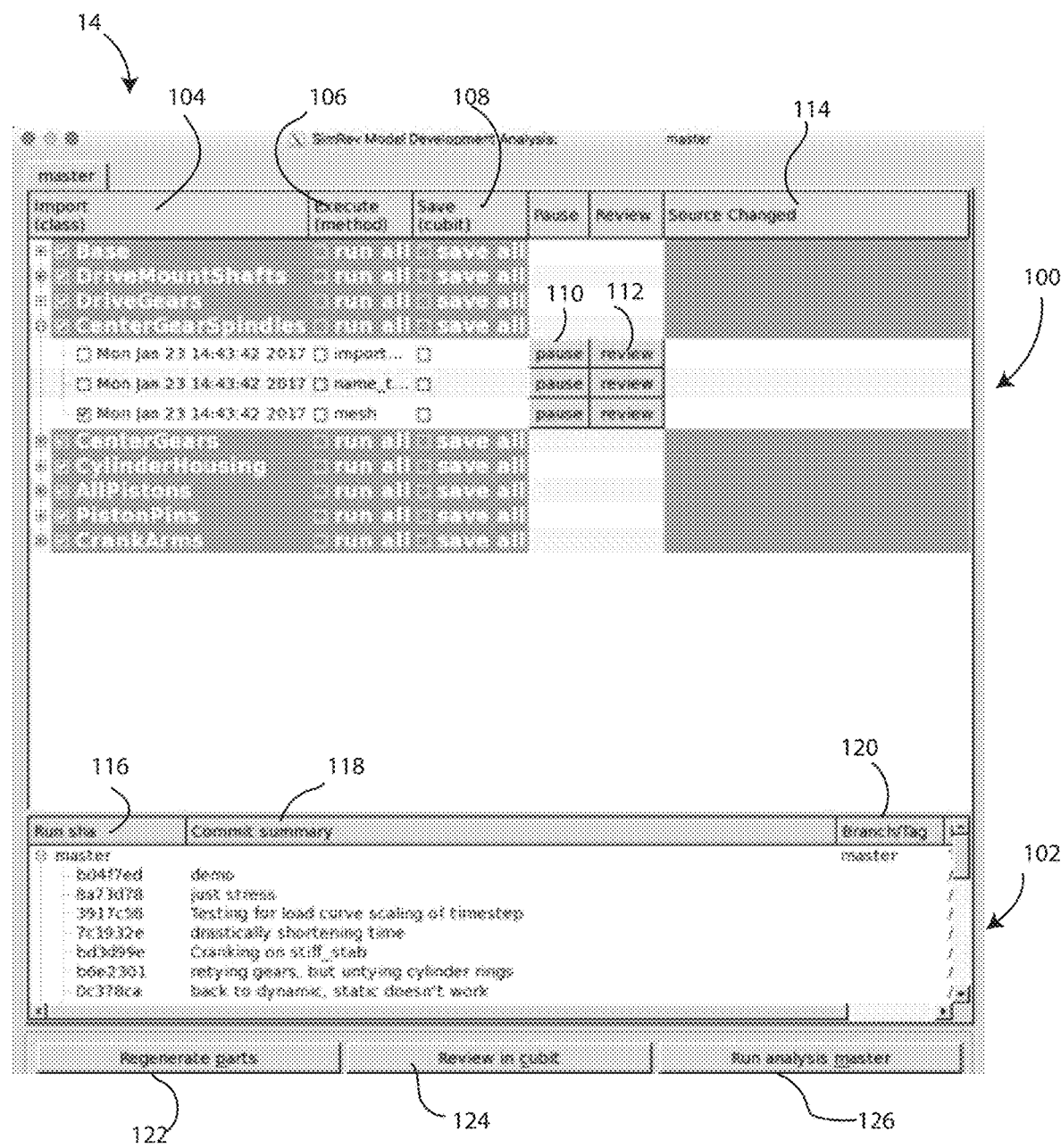
FIG. 4 is an exemplary user interface presented by the Simrev tool.

Before delving more deeply into the inner workings of the Simrev design and manufacturing tool, FIG. 4 will present an overview of a presently preferred user interface 14. The user interface is split between a top half 100 for setting up the problem, and bottom half 102 for monitoring the runs. The top half contains a listing in column 104 of the Parts in the analysis that have been tracked by import or explicitly specified in an iteration task list. The exemplary user interface of FIG. 4 shows only one tab, designated "master" across the top, but there may be more tabs that are correlated either to user specified iterations or branches in the underlying code repository. The top half 100 is organized into the following columns. Import column 104 is for importing from the results of a particular class method (function). Column 106 is for running the code within that method. Column 108 is for saving the results after running the method.

As illustrated, the listing of parts in the import column 104 presents related information in a nested outline form where individual members of a selected category of parts can be displayed, or hidden. To illustrate, in FIG. 4, the "CenterGearSpindles" category of parts has been expanded to reveal that there are three nested sub components within this category. That nested structure may be extended to an arbitrary level of modules, containing Part classes and their methods, in a manner consistent with subassembly organization. By clicking on the "pause" button 110 adjacent one of these sub component listings, the engineer can cause execution of selected subcomponent or aspect to be suspended. Doing this will allow the remainder of the collection of parts to be generated or regenerated without affecting those items which were paused. Alternatively, by clicking on the "review" button 112, the engineer can cause the selected subcomponent or aspect to be generated or regenerated, without affecting the state of the remainder of the parts. Whenever a change to the source code is made by the engineer or a collaborator, an identifier for the changed code will be presented in the source changed column 114. That Part alone may then be regenerated.

The user interface maintains a running record of each analysis run made during part design and analysis. This record appears in the bottom half 102 of the interface. Specifically, each time the user sets up a new run to be performed, whether that run is to create or update a part, or to execute a series of analytical tests on the part or assembly, the Simrev processor assigns a unique identifier to that run. The unique identifier corresponds to the hash that is generated when a changed version of the Simrev (Python) code is recorded to the GIT repository by issuing a commit command. Repository "tags" may be used to give the run a more human-readable name. These tags are rendered to the Simrev interface.

In the example provided in FIG. 4, the collection of runs belonging to the iterations labeled "master" are shown in the run column 116 together with a textual commit summary in column 118. Note that each iteration in the run column 116 is identified by its unique hash tag (e.g., b04f7ed, Ba73d78, etc.). A branch/tag column 120 is provided to aid in differentiating among different organized sets of runs.

The user interface includes three buttons beneath the bottom half of the interface to allow the engineer to execute important functions of the Simrev processor. The regenerate parts button 122 causes all of the parts with "run" checkmarks to be generated (for the first time) or regenerated (thereafter). This causes the Simrev processor to parse and analyze the "pythonic" code developed by the engineer(s) and to generate the geometry and mesh of the Part suitable for the high fidelity analysis system of choice. Note that this regeneration operation does not submit the assembly file to the analysis system, but merely generates an intermediate set of data that could be assembled and submitted to the analysis system.

The review in cubit button 124 submits the regenerated code to the CUBIT graphical meshing system for three-dimensional rendering. Thus this button allows the engineer(s) to view a graphical rendering of the physical part being designed. The CUBIT system allows the rendered object to be rotated in virtual 3D space. Individual "review" buttons are provided to allow this procedure for Parts of the subassembly, instead of the whole system.

The run analysis button 126 causes the Simrev processor to assemble the independent parts, and submit the regenerated assembly file to the high fidelity analysis system of choice where engineer-specified simulations and analyses are performed using the supercomputers that are running the high fidelity analysis system. If changes have been made to the Simrev (Python) code under version control, and the run analysis button 126 is pushed, the Simrev processor 28 will detect that changes have been made that may result in an analysis that has not been version controlled by GIT. The Simrev processor 28 will prompt for a GIT Commit message and a new commit hash will be generated for the run before the space is created on the parallel file system and the analysis input is generated and analyzed within this space.

While the graphical user interface 14 of FIG. 4 provides a helpful interface in performing common tasks, the functionality of the graphical user interface is also duplicated through command line instructions. To execute such command line instructions the user launches the Simrev main program by issuing a command line instruction in a terminal window of the computer. The Simrev processor will respond to regenerate parts, review in cubit and run analysis commands issued from the command line.

Indeed, for creating the actual Simrev pythonic code to specify parts and the tests to be performed on them, the engineer will typically use a text editor of choice. While essentially any text editor can be used, the Vim text editor will be adopted here. To make creation of pythonic Simrev code and execution of commands to the Simrev processor easier, the standard Vim text editor may be augmented with a set of plugins. Plugins can be used, for example, to allow the engineer to review changes in the GIT repository made by the engineer or her colleagues.

Data Flow

Figure 5:
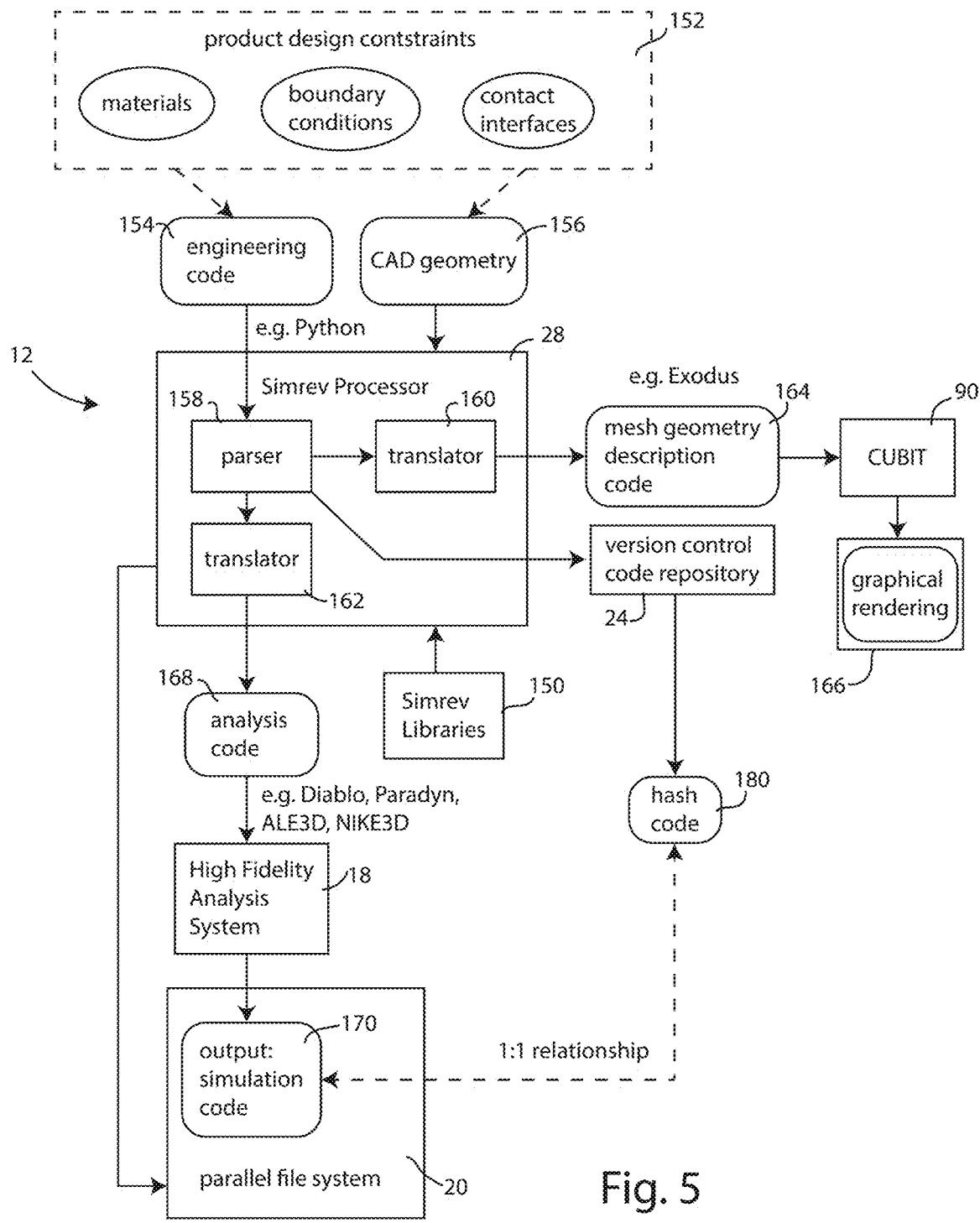
FIG. 5 is a data flow diagram useful in understanding how the Simrev tool is constructed.

Referring now to FIG. 5, the illustrated data flow diagram will further explain how the Simrev tool is configured. At the core of the Simrev processor 12 is the processor 28 and the associated Simrev libraries 150. These libraries are stored in memory 30 (FIG. 2) attached to the processor 28. The overarching functionality of the Simrev processor 12 is to express product design constraints in a way so they can be modeled for viewing as a three-dimensional graphical rendering and also modeled for simulation of physical conditions by high-powered supercomputer simulation tools. An important aspect of the Simrev processor 12 is that it allows the entire product design and simulation process to be tracked using a version control tool that uniquely associates the product design and testing recipes created by the design engineers from the massive quantities of output results generated by the supercomputer simulation system.

For physical part and assembled product design and manufacturing, the key product design constraints used by the Simrev tool have been illustrated at 152. These constraints can be organized into three groups or classes: materials, boundary conditions and contact interfaces. These boundary constraints describe the rigors that physical parts are subjected to, and means by which the proper design withstands its environment when duly manufactured to specification. Materials specify the type, physical parameters, and model of supercomputer approximation for materials used for a part (e.g. steel and aluminum), or the part's environment (e.g. fast-moving air, high-pressure fluid). Boundary conditions, in structural mechanics, correspond to things like concentrated force, pressure distributed on a surface, temperature, heat flux, or simply moving an object, or a portion thereof, by a specified distance (displacement). The concept is widened in fluid mechanics to include outflow, pressure continuity, and wall turbulence. Contact interfaces define how parts fit together and describe the nature of the fit (e.g., sliding friction, meshing gear, welded, etc.).

The Simrev processor handles boundary conditions and contact conditions similarly, by associating the name of a surface with a software object, and having that object hold data; e.g., a displacement value; and related options on how such data is applied within the simulation code, are stored on a class instance. These values are later passed to the equations being solved in the supercomputer. The boundary condition object, material object, and (usually half) of the contact interface is instantiated in the part being specified by the programmer (user). If this "best practice" is followed by the user, the Simrev-provided objects are only defined when this particular part is desired by the user, which makes the assembly modular, where parts can be exchanged or left-out of particular analyses. Furthermore, new parts may be "inherited" from old parts by following the common object oriented programming practice of inheritance. The keywords stored on the object are passed to the analysis code.

The geometry upon which the product design constraints apply are input to the Simrev processor by two basic routes: They can be entered as engineering code 154 (supplied by the design engineer using text-based, object oriented code statements (e.g. in Python). Additionally, geometry during product design can be imported as computer aided design (CAD) geometry 156 directly from a CAD system (not shown). If the former approach is used, human-readable commands build the geometry as an outcome of the version-controlled Python program. If the latter approach is used and the CAD geometry 156 is subjected to version control, the engineer and her collaborators can be made aware of when a change was made to the geometry and who made it, but not what the change entails (barring a descriptive commit-message). There are some CAD engines that may accept commands in Python, e.g. FreeCAD. Often a mixture of the two approaches is taken, where CAD geometry 156 must be simplified for the purposes of generating a computational mesh. It is this procedure that benefits from the means of "divide and conquer" provided by developing Simrev Parts in different modules (Python files) and assigning responsibility for developing those modules to different engineers.

The Simrev processor 28 parses the engineering code as at 158 and then uses the parsed engineering code (together with CAD geometry data 156 as applicable) to perform several code translation processes, depicted as translator 160 and translator 162. In performing these translation processes the Simrev processor 28 makes calls to the Simrev libraries 150, as needed to translate the parsed engineering code and CAD geometry into instructions that will be meaningful to the 3D graphical rendering system (e.g. CUBIT 90) and to the high fidelity analysis system running on the supercomputer. In FIG. 5 the parser 158 and translators 160 and 162 are higher level representations of the Simrev processor shown in FIG. 2. Thus the parser 158 of FIG. 5 includes the lexical analyzer 32, syntax analyzer 36, semantic analyzer 40 and optimizer 44 of FIG. 2. The translators 160 and 162 of FIG. 5 would include the code preparation engine 48 and code generator 52 of FIG. 2.

To interface with a 3D graphical rendering engine, such as the CUBIT tool 90, translator 160 of the Simrev processor 28 utilizes mesh and geometry description code 164 in the language appropriate for the rendering engine (CUBIT's own Python API). After the translator 160 is applied, for specific case of the CUBIT tool, the mesh geometry description code is generated using the Exodus format. The CUBIT tool 90 interprets the mesh geometry description code 164 to generate a rotatable three-dimensional graphical rendering of the part or assembly being modeled. The graphical rendering may be output to a display device 166.

To interface with the high fidelity analysis system 18, the translator 162 of the Simrev processor 28 generates analysis code 168, which is in the format required for the particular analysis system being utilized. Illustrated in FIG. 5, the analysis code may be in a format suitable for one of Diablo, Paradyn, ALE3D and NIKE3d, for example. This analysis code 168 is preferably submitted to the supercomputer computer running the high fidelity analysis system software as batch job to be run on the supercomputer. The results of the high fidelity analysis are stored as output simulation code 170 in the parallel file system 20 of the supercomputer. Whereas the analysis code 168, supplied as input to the analysis system 18 is relatively small in size (e.g. in the megabyte range), the output simulation code 170 will typically be several orders of magnitude greater (e.g., in the gigabyte to terabyte range).

The Simrev processor performs the important function of capturing all engineering design decisions within the version control code repository system 24 (e.g. GIT system). The version control code repository allows the engineering team to see every single change that was committed to the version control system, and this commit process is mediated by the Simrev processor and thus happens automatically. If desired, the engineering team can roll back to a previous version at any time, without losing any work done on subsequent versions. Furthermore, team members may branch their own conceptual ideas, utilizing the best state of their colleagues' contributions, determine if their concept has improved the design via supercomputing simulation, then merge the relevant changes into the team codebase. All of these concepts are frequently used in software design and construction but have heretofore been unavailable to manufacturing engineers.

Among the engineering changes that are captured in the version control code repository 24 are CAD geometry (which may be expressed as binary data from the CAD system and thus not readily editable by the engineering team). All changes to materials, boundary conditions and contact interfaces made by the engineering team in writing engineering code 154 are also captured. Similarly, keywords used in the analysis code 168 are likewise captured in the version control system.

One-to-One Integration

Due to the massive size of the output simulation code 170, it is infeasible to store this directly in the version control code repository. Thus the Simrev processor generates a hash code 180 from each commit in the version control code repository and uses that to label the corresponding file storing output simulation code 170 in the parallel file system. In addition to generating the hash code, the Simrev processor 28 interfaces with the operating system that mediates the parallel file system 20, creating the empty folder in the parallel file system to contain the output simulation code 170. The Simrev processor 28 thus associates the hash code 180 with the folder and a file within containing the hash and in this way it defines a one-to-one relationship between the information captured in the version control code repository and the output captured in the parallel file system 20.

Integrating these two systems in this fashion provides the very powerful benefit of allowing the results of any simulation to be examined without having to rerun the entire simulation process on the high fidelity analysis system 18. By simply selecting a certain "version" or state of development from the version control system, the corresponding simulation code output can be directly referenced by lookup of the corresponding hash code.

Because the engineering input is supplied using what is, in essence, computer code written in a widely supported computer language, such as Python, the Simrev tool opens the door to a wide variety of engineering collaboration tools that have not been available heretofore in this art. Illustrated in FIG. 6, the Simrev tool 12 is coupled to a computer network 200 to which a plurality of engineering workstations 202 are also coupled. As illustrated, these engineering workstations include a native text editor, shown separately at 204 for clarity. The product design and manufacturing engineers enter the object-oriented text-based instructions using these text editors and this engineering code is input into the Simrev tool. The Simrev tool 12 makes use of the graphical rendering services of the CUBIT graphical meshing system 90. As discussed above, the Simrev tool 12 also works closely with the version control code repository 24, which is also coupled to the network 200. The high fidelity analysis system or systems 18 communicate with the network 200 either directly, as a node on the network, or through a gateway device if separate engineering and supercomputer networks are implemented.

Figure 6:
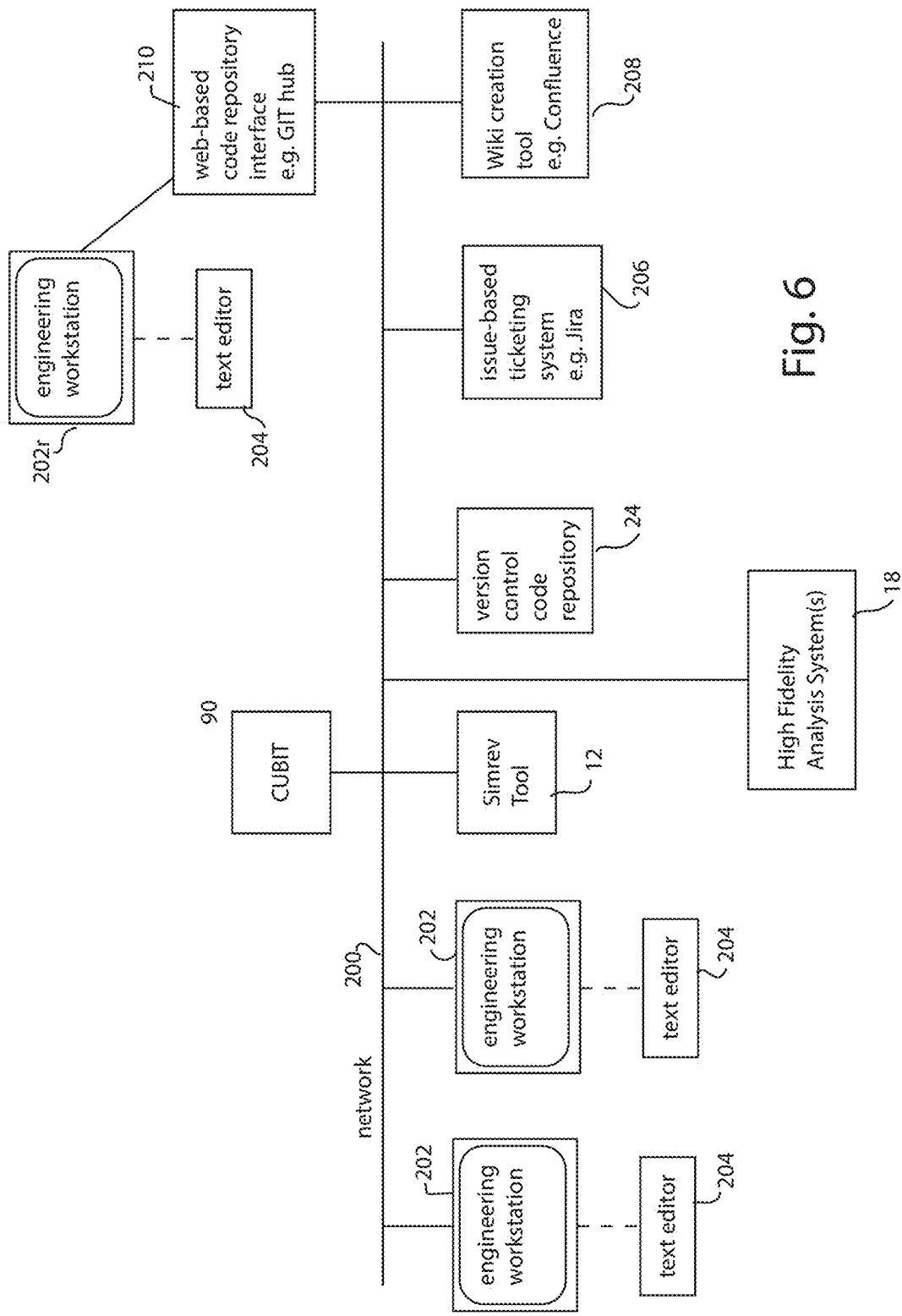
FIG. 6 is a system diagram showing how the Simrev tool integrates with other collaboration tools in the engineering part design and manufacturing environment.

As one example of an engineering collaboration tool, illustrated in FIG. 6, is an issue-based ticketing system 206 coupled to the network. This ticketing system can be implemented using the commercially available Jira ticketing system, which allows engineers to create bug report tickets that are tied to the version control code repository. These tickets can be assigned to other engineers to correct the bug or otherwise resolve the issue, documenting how the issue was addressed. Configuration updates and "versions" of the code, and thereby the physical item, can be maintained and released using the Jira system. Such development may follow "Agile" norms with "Scrum" development boards and other software programming techniques.

Also coupled to network 200 is a Wiki creation tool 208, such as the commercially available Confluence tool. This tool is also tied to the version control code repository and allows engineers to create code documentation, help files, user instructions and other documentation in support of the part being designed. It becomes possible to closely integrate part development with the Wiki creation tool because the physical specifications for the developed part are expressed in a computer code form that can be mediated by the version control code repository 24. The Wiki produced by the Wiki creation tool is likewise mediated by the version control code repository. In this way any Help files and other documentation will automatically track with any changes made to the part under development.

Additionally, if desired, a web-based code repository interface 210 (e.g. GitHub, GitLab, or Bitbucket), may be coupled to the network 200, to allow engineers a transparent view into the changes being made by colleagues. Engineers working off-site or those in a managerial or product development role may also monitor and participate in part development using a personal computer or remote engineering workstation 202r, as illustrated.

Detailed Description of the Simrev Processor Library

The following will present a more detailed description of some of the class libraries listed in the Appendix. As discussed above, the illustrated embodiment is written in Python and engineers using the Simrev tool use the a pythonic text-based language to describe both the parts being designed and the simulation tests to be run. Thus the following description is written in the context of a Python implementation. Of course other languages can be used, in which case the class libraries discussed below would be written using the syntax of the chosen language.

Simrev Main

To start the Simrev tool, the main program describing a particular product (main.py) is launched. Upon launch, the main program imports the Simrev package, which causes the code at the bottom level of simrev/_init_.py to be executed. When the Simrev package is imported, the first thing it does is trigger an override of the standard import command in python.

The next step in main.py is to import a series of "parts." This is done by importing Parts classes from a user defined module containing Python code. As used herein the term module refers to a file containing python code. The contained code can include both process instructions to be performed by a processor and structured data used by those process instructions. The Python language is object-oriented and supports inheritance. This allows functionality (and data) represented by one class to be inherited and used by another class.

By way of example, consider the case where the Simrev tool is being used to develop an engine that includes a crank arm. Thus the development engineer may create a user defined class, called crank_arms, stored as a module (file) called crank_arms.py. In the engine design there may be several different crank arm objects (corresponding to different physical parts within the engine). Each such crank arm would inherit the properties from the crank_arms.py module. Thus any class that is imported from crank_arms.py, with the "from crank_arms import Arms" python syntax, will be logged. The imported class will also inherit from another simrev class, part.Part, as discussed more fully below. The developer of main.py then includes a call to the simrev.GuiLoad method, which launches the GUI (unless overridden by command line options). The part name (class name) and module from which that part is imported (file name), are added to a list kept by Simrev, and the part name is displayed in the GUI with a series of check-marks next to both the class name, and the name of any methods (class functions). Class methods that the developer does not wish to have appear in the GUI may be hidden by the programmer with a function decorator in the source code.

The Part Module

The Part module holds information about physical objects and manages the mapping of python code to the simulation of those objects. In practical terms, the Part module provides a common class, also called Part, to derive new parts from, and provides methods and behavior that track when Part classes are imported into a simrev model. The Part class provides a handy way to save, import, and use the content of the Part's methods. Less work must be done by the analyst and various stages of the Part's development can be broken-up and managed by a team of analysts. Furthermore, parts derived from the Part class may be inherited from to evolve a system configuration and re-use work.

The Part module also assists in the redefinition of the import statement, so that all imports of simrev defined parts are tracked and these parts can be used to create an analysis with the minimum of code setup.

Breakpoints at Class Functions

Simrev does introspection on the classes that inherit from part. Part. The simrev/part.py module is responsible for reading the source code of any module (like crank_arms.py) where part classes reside. Each class function is treated like a unit of work and the geometry is saved so that the execution can pick up from that point at some time in the future. Since changes to the source code are tracked per-function, changes that require a rebuild of the geometry may not have to start all the way from the beginning of the code. This saves model development time as the developer hammers away at a particular issue, only having to return to the previous "save" state. This is like being able to save a video game right before fighting the boss, so that instead of playing the whole level over, the engineer simply works on the hard part.

The graphical user interface provides a series of check-marks to "import" from a particular break-point, to "run" the code within a function, and to "save" the results of running that code. The part module checks to see that the geometry files that result from these class functions have timestamps that are in order and that no changes have occurred to the source code. If that's true, then the default is to import the work for the part from the last class function in the class.

Other Part Module Features

Some simulations (ALE3D in particular) can accept both parts meshed with conformal hexahedral elements, and those "shaped in," which means being meshed with tetrahedrals then imported over a hexahedral background. Because ALE3D allows material to move through the mesh, the mesh may just be a box of background material like air that contains a series of these tetrahedral meshes for the solid parts. The part module has been programmed to track and place tetrahedral shapes, and can export tetrahedral meshes to the exodus file format, then translate that information to a plain text "proe" file format specific to ALE3D. This translation process can also break up a large component made up of tetrahedrals into a number of smaller files using the METIS algorithm.

Main Program Objects

Defining an analysis object.

The user defines an analysis object in his or her main.py by importing a ModelDevel object from simrev. This object has a number of documented keywords, and when it is initialized, it serves to establish a name for the development project, which then gets used to create various directories in the filesystem. Two notable options that affect the look of the GUI are "iterations" and "iteration_tasks," which allow the user to create tabs in the GUI with different content.

Defining a Deck Object

The next task for the user is to define a deck object. All FEA simulation codes have some means of inputting options to the code in question. Here the user must pick from a specific simulation code that simrev supports, by importing from a specific code module (e.g. from codes.paradyn import Deck), and instantiate a single deck object. Once that is done, the user has some flexibility in that keywords are now "pythonic," but keyword assignment is still beholden to a certain level of understanding of the analysis code's structure and specific user manual. For example, block structured input for ALE3D is of the form:

```
deck.advection.rlxuprop = 2
deck.advection.advcycle = 5
deck.advection.rlxginit = 0.7
``` and appears in the input file like this:

```
ADVECTION
  rlxuprop 2
  advcycle 5
  rlxginit 0.7
END
```

While for diablo, python code that looks like this:

```
deck.time_step.end_time = time
deck.time_step.initial_time_step = 1e-5
deck.time_step.max_num_time_steps = int(time/ float(dt))
deck.time_step.time_step_selection = [[0,1e-5], [3e-5, 1e-5], [5e-5,
1e-3], [2e-3, 0.5]]
deck.time_step.analysis_type="DYNAMIC"
```

Will result in the following set of block-structured text in the "assembly" file.

```
#start_time_step
  #start_mechanics_integration
    #mechanics_name STRESS
    #time_integrator NEWMARK
    #beta 0.5
    #gamma 0.9
  #end_mechanics_integration
  #start_mechanics_time_step
    #mechanics_name STRESS
    #max_num_nonlinear_iters 80
  #end_mechanics_time_step
  #end_time 1
  #initial_time_step 1e-05
  #max_num_time_steps 5
  #time_step_selection SCALING_CURVE
  #analysis_type DYNAMIC
  #time_step_curve_label 1
#end_time_step
```

In general, there is no one-to-one mapping between a pythonic representation of a simulation code input and the format chosen by the analysis code developer. For example, the scaling curve for the time step in the example above is written elsewhere in the file, and the Newmark integration parameters are defaults contained within the Simrev tool. However, using this "attribute chain" for the deck object means that complicated analysis-code-specific options can sometimes be handled with a common language in python. The goal is to get any analysis keyword options into the repository controlled files that support the main program while providing some defaults for common parameters. Then, any changes in analysis options, and their resulting impact on the simulation results, are tracked by the Simrev framework using GIT.

The input deck functionality in Simrev is implemented using the_getattr_and_setattr_methods available in the core Python data model. This is a type of code introspection allows the creation of any new attribute (the name that appears after the dot (".") separating two valid names) and it's value to be recorded and stored. By using these methods of runtime code introspection, keywords and values can be passed to the analysis code from a variety of objects that are instantiated at runtime, like deck objects, materials, boundary conditions, and contact interfaces. These objects, likewise, can organize themselves into a coherent order depending on the order in which they were instantiated, which the user typically does not care about, as long as the associated keywords or analysis options are surely passed to the corresponding location in the input deck.

Batch

Batch is a module to interact with the SLURM batch system on LLNL cluster machines. The module is concerned with building a *.msub file that contains arguments to the SLURM system (as comments) and shell executable statements that call a particular massively parallel code. There is also a good amount of effort to find the correct run-size based on rules of thumb around the size of the problem at hand.

The classes in this module are specific to each code, but all inherit from Batch. Classes have their own "which{code}" attributes, that point to a specific executable, allowing the user to specify alpha and development versions elsewhere in the filesystem.

The final main program object that must be defined is the batch object. This object is also specific to the analysis code that is being run because command line argument structure differs. The batch object handles how much time and computational resources should be allocated to the job, and other aspects of running the job that can become very specific to the analysis, like parallel partitioning. Once again "pythonic" keywords to the Simple Linux Utility for Resource Management (SLURM) batch system may be defined on the batch object. Any changes in the amount of resources required to run the analysis can be tracked and shared with collaborators using version control, along with any chosen enterprise management system, so that the resource requests grow with the complexity of the problem. The batch object writes an "msub" file with the instructions for the batch scheduler and then submits the job at the user's request with a command of the same name. The user must notify the analysis object of the batch and deck objects by calling a function or using an assignment statement in the main program. The analysis object also contains a data attribute for a "group permission" which will then open the permissions of the analysis results folder to other members of the group, further facilitating collaborative model development.

GIT Integration and Running the Module

Once the engineer is satisfied that his or her intent is being followed, the engineer will want to run the simulation code. At this point, if git integration is turned on, and the "Run analysis" button is pushed, simrev will check to see if the repository is "clean" or "dirty." If the repository is clean, meaning there are no changes to the files being tracked, simrev will create a directory on the lscratch system with a combination of the analysis name, the branch name, and the first seven letters of the "hex representation" of the sha1 hash of the commit. The sha1 hash, parsed like this, has a 50% chance of encountering a "collision," meaning the first seven letters are the same, once the simulations on the branch exceed a million. More characters could be used, up to the full 40 characters, but this level seemed reasonable for expected use patterns.

If the repository is dirty, simrev will ask the user to input a commit message, and use the new commit hash returned by git to run the job. This way, no changes to the analysis can be run without first being added to the repository.

Version Control of Geometry

Another "norm" for effective use of simrev is to keep the CAD geometry version controlled. Most git repository servers have a "Large File Storage" feature that is well suited to this purpose. Commands associated with the meshing and the "cleanup" of geometry may need to change if the part under consideration is changed. But the best practice is to make updates to the same CAD geometry file, and commit changes with that along with the commands required to transform it into a viable analysis. CAD geometry is typically stored in the same folder as the main program, in the "geom" directory, although simrev does not look for this by default like it does for "mats."

Exporting Exodus Files

Exporting an exodus mesh geometry file is always a step in the process of running an analysis code with simrev. For ALE3D and Diablo, the exodus file is read by the analysis code along with a small amount of metadata in text-only input files. For Paradyn and NIKE3D, the geometric information and connectivity of the mesh must be written to an appropriate format in ASCII plain text. Much of the functionality within codes/paradyn.py, for example, is dedicated to insuring that the boundary and contact objects write data to the correct location in the paradyn input file, and that it is formatted correctly. Occasionally, for advanced analyses with ALE3D, multiple exodus files will be written. Some of them may contain tetrahedral mesh. The export step is performed from the main simrev_init_.py module.

Cubit Tools

Simrev is integrated with Cubit. Portions of Simrev function as a wrapper to drive the Cubit program and maintain control over how data was saved at various steps in the meshing process. The simrev/cubittools.py module contains a number of functions that use the cubit python interface, and a standard for each user defined part subassembly module is to import everything from that namespace (from simrev.cubittools import *). It contains an extremely shorthand function "c" for the cubit.cmd function that is documented in the Cubit interface (also known commercially as Trelis, who maintains the online manual).

An advanced user will program their part classes using other features of the cubit interface such as volume and surface objects. Simrev is combined with ipython (interactive python) to provide an integrated development environment for the Cubit python SWIG interface, and cubittools provides convenience functions for accessing those objects.

Cubit tools from simrev also include a "pause" function that starts a graphics window and allows the user to move and rotate the computational geometry. The pause feature is used along with a commanded interrupt (control-D) to "stack trace" into the part class method that's currently being worked on. This interface provides a quick way for the "main program" to get built, by focusing on one part at a time, and having precise control over the combination of methods, algorithms, and human decision-making that's required for successful processing and preparation of CAD geometry for a successful analysis.

Model Development—Tool in Use

Model Development and "Regenerate Parts"

The "regenerate parts" button on the left will call each function of each part in the order shown, but it will clear and reset the geometry kernel between parts (classes). Therefore, work to mesh a part is independent and bugs from one part cannot affect the meshing of another part. In general, the user will want to "get the part in order," as shown below, where the time-stamps of each saved-action are in chronological order and the final state of the part is ready to be "imported" into the assembly (Review in cubit or Run analysis). If a part is not in order, the folding will be opened, and if simrev detects that a class method is new or has changed, the color of the class may be adjusted from grey to red.

The last three columns contain buttons for pausing the process and bringing up a minimal visualization window (pause), for launching a full-fledged cubit GUI on that part alone (review), and to indicate to the user that the source code has changed. If the source in a given method has changed, the import check mark will be set to the method preceding the change, and every method from the change on down will be marked with a "save" and "run" check. Regenerating the parts will then incorporate the change to the user's geometry files. Any parts that are "in order" will not be run at all, saving time. If a user synchronizes their code repository to a remote, and checks out a remote branch (an operation known as pulling), the changes that one of their collaborators will be detected by simrev and the GUI will prompt them to regenerate their part geometry. There is also an option on the analysis object to work on geometry files that have been saved in a shared location (on lscratch).

Often the analyst will spend a great deal of time getting the mesh parameters just right and insuring that there are no problems with the assignment of the materials, boundary conditions, and contact interfaces. This is done by naming the geometry using cubit commands in the class functions and defining various python objects that are provided by simrev to map the geometric items to the material or analysis related properties.

Reviewing Materials, Boundary Conditions, and Interfaces

Once the various parts have been put in order, the analyst will want to verify that he or she did not make any errors on the whole analysis that were hard to catch when working on separate parts. The middle "review in cubit" button is provided for this purpose. This button gathers up each part and parses entities that have been defined in the simrev/boundary.py, simrev/material.py, and simrev/contact.py modules. Each of these modules provide classes that interface both with Cubit and with the simulation code output format, and function as a bridge between the geometry and various code options related to materials, boundaries, and interfaces.

The benefit to using objects for handling those three types of items is that the objects may be named sensibly and carry meaning to the person building the model (instead of just a number) and that keywords that are specific to the particular object can be assigned using the pythonic syntax similar to what's already been shown for "Deck" objects. Simrev searches for material "cards," which have formatting and material model data particular to the simulation code, in a folder where the main program runs called "mats." Simrev also contains some limited ability to specify material parameters "pythonically" using the material object for some analysis codes. This feature is most applicable to Paradyn.

For an example of how material, contact and boundary condition objects work, let's explore the case where an analysis has a great number of "sliding" contact interfaces between parts in an assembly. Focus on just two different contact objects, which could for example have different friction coefficients. The user does not care that contact surface number 5 has a coefficient of 0.3, and number 6 has 0.2, and they have no interest in tracking the numbers even though that is how surfaces are defined in most analysis codes. Furthermore, if an object is inserted between 5 and 6, and the objects are responsible for determining their own numbering scheme, the knock-on effect of changing 6, 7, etc., is handled automatically by the computer program. Because Simrev treats each of these three entity types with objects, the ultimate numbering is immaterial.

From a computational geometry perspective, when reviewing the model that now has mesh, "blocks" are assigned to materials, "sidesets" are assigned to contact interfaces (depending on the simulation code) and "nodesets" are assigned to the boundary conditions. Boundary conditions are typically things like initial velocity, outflow, pressure continuity, etc., and can be very specific to the simulation code of interest. Simrev tries to standardize the means of assigning data through object attributes, but doesn't succeed in every case.

Each material, boundary condition, and contact interface goes on to name a Cubit block, sideset, and nodeset, as derived from the python code they're writing. Assigning these blocks, etc., and insuring that the keywords associated with each are transmitted to the appropriate location in the input deck is the primary focus of the materials.py, boundary.py, and contact.py simrev modules, and the review process insures there are no bugs in the main program.

Human Readability and Collaboration

The user has the option of adding a "tag" to the repository using the git command line. That is typically done to give a human readable message indicating what the commit is used for. In software development, this is typically a version number. However, tags are mutable, and the only true way to ensure that a simulation result is indeed from a given commit, is to work with the hash. For this reason, the full sha1 hash value is written into the folder where the job runs on the Iscratch system.

If the user then launches the main program again, the lower part of the simrev GUI displays columns for the branch name, the commit hash, the commit message, the branch, and where the job is run.

Comments on Coding Norms—Part and Object Initialization

Simrev relies on the user to adhere to a set of norms in order to best take advantage of the features in simrev. Most notably, simrev typically controls the time at which a class is initialized. Simrev can work with class objects, as well as class instances, but it's best not to pass any arguments to the initialization function for a class that derives from Part. Also, it's important to recognize that class methods are typically not invoked, and so if material, boundary condition, and interface objects are defined for a particular part, that should be done in the initialization function of the part (_init_).

This practice raises a unique aspect about interfaces between parts. Two different parts may define the same contact object, but contribute only one side of that contact, referred to as the master or slave side. The class methods of one part will name the master surface geometry, and the methods of a different part (class) will name the slave. The contact module in simrev is built to return an existing contact object if an object name that has already been defined is passed in to the constructor. This way, the initialization function of both parts can call the contact constructor, and whichever part is initialized first will create the contact object and inform it of the master side name. The later call will return the same object and assign the slave surface geometry name. Cubit will be instructed to build a sideset out of both of those surfaces and name them appropriately in the exodus geometry export.

Materials behave similarly, although often a single set of material parameters will want to be repeated a number of times so that different parts stand out from one another in the post-processing phase. An optional keyword to "copy" the material card is provided, which has different behavior in ALE3D vs. Paradyn, but serves to keep regions of the same material separate for plotting or other analysis purposes. Some features in Paradyn for rigid body geometry and kinematic constraints were also implemented in the material module. Furthermore, certain boundary condition objects will change more than one thing in the analysis code input deck. For example, and outflow condition for ALE3D will also specify a pressure continuous condition since the two are rarely used independently of one another.

Unit Testing

Software is often comprised of various units that should pass certain specifications on their own. Ideally software will test itself for compliance as its developed. The practice of insuring that these top-level package requirements are continuously met as building blocks get agglomerated is called unit testing.

In hardware development, often separate subsystems are required to meet certain specifications and integrated through an "interface control document." Another programming norm that can be exploited in simrev is to create multiple "test" programs, each running only one or two parts through unique conditions. The purpose is to have a small set of tests insure that changes to these parts don't compromise their contribution to the assembly, because running the full assembly can be an "expensive" proposition from a computational resources perspective. Unit tests should be written with the "if_name_=="_main_":" python idiom at the bottom of part assembly files.

Use of the Simrev Tool in Physical Part Manufacturing

In the disclosure above, a small piston driven engine was featured as an example of one physical product that can be designed using the Simrev tool. While there are many different manufacturing processes that can be used to produce a physical part from the data generated by the Simrev tool, one process of growing importance is additive manufacturing. In additive manufacturing the part is manufactured by adding successive layers of material, usually under computer control.

To manufacture the featured small piston driven engine from the data generated by the Simrev tool is converted to additive manufacturing machine control instructions which then guide the additive manufacturing material depositing head in a two dimensional pattern as layer-upon-layer of material is laid down.

Specifically, the Simrev tool is programmed to output additive manufacturing part definitions in a StereoLithography (STL) format used to print something either by thermoplastic extrusion of plastic or by laser-melting of metal (powder bed). The STL format is yet another representation of the geometry of the finished part, much like the Exodus format used for finite element analysis. The STL format is a description of the exterior of the final part where triangular facets delineate the boundary between the metal or plastic part and the surrounding air. Selective Laser Melting (SLM) is a type of additive manufacturing technique capable of producing high-quality engineering parts in steel, titanium, and other metals; there is a risk that residual stresses will build up in large parts as a result of the high temperatures used to melt the metal. Most SLM machines can read and recognize STL files, and may accept optional additional information for planning the laser path needed to form the finished part. Finite element analysis codes, including Diablo, are increasingly becoming used to analyze the residual stresses that develop in a part during the additive manufacturing process. The Simrev processor can be used to perform an analysis of the additive manufacturing process itself. Through this method, the engineering lifespan of an additively manufactured part, and its performance from a load and displacement perspective, can be accurately predicted. A design cycle for an additively manufactured part utilizing Simrev performs an analysis of the SLM manufacturing process, and transfers the part residual stresses to the stress and displacement analysis of the part in its service configuration. The result is a part that can be designed, printed, and reliably used in service straight from the printer, without "build failures" from excessive residual stress.

The Simrev processor is not limited to quality control of manufactured engineering components. Rather, the processing system exemplified by Simrev is a general technique for controlling any simulation-derived data as the inputs to this simulation change over time and as the design of the system being simulated changes. For example if a prototype aircraft is designed using CAD tools but never built; the improvements and "lessons learned" regarding the combination of engine mechanics, wing aerodynamics and connection behavior, or flight stability, as some examples of many; which come from the application of Simrev; are a product of the ability to track changes in a variety of simulations at once. The exemplary instance of the Simrev processor is already capable of running four different engineering analysis codes, and there is no restriction to additional codes. Therefore, a single user-generated "main.py" may run a suite of analyses. In the example of the experimental prototype aircraft; combustion analysis on the engine, aerodynamics and structural analysis on the wing and chassis, and a series of fluid mechanics calculations used to determine a flight envelope; may all be run, and the results will refer to the same commit hash from the version control system. Subsequent changes to any one of the systems on the aircraft (captured in the commit) will be run through a "test suite" in the same way that software products are tested using a framework called "continuous integration" (CI) (sometimes also known as "nightly builds"). The analogy that the Simrev processor provides to software CI is that the demands on the physical system are captured as "tests" run through engineering analysis software on supercomputing platforms. The tests are part of the software program that utilizes the Simrev processing architecture, and may be referred to as "Built In Self-Tests" (BIST). The programming norm known as "Test Driven Development" may be used as an approach to designing a successful built-system from a set of components, sub-assemblies, and assemblies. Appendix: Excerpt from a Piston Engine as Example, main.py is Below, pistons.py (a Single Part) Follows.

```
#!/usr/bin/env python
"""
The main program for thermo-structural analysis of an engine.
Using the simrev library and Simrev GUI to submit supercomputing jobs.
"""
import simrev
from simrev.batch import DiabloBatch
from simrev.codes.diablo import Deck
from base import Base
from spindles import DriveMountShafts
from gears import DriveGears
from spindles import CenterGearSpindles
from gears import CenterGears
from cylinders import CylinderHousing
from pistons import AllPistons # This part is profiled below
from spindles import PistonPins
from crank_arms import CrankArms
time = 1
dt = time / 5.
pistonpin_time = dt
crankdrive_time = 2*dt
geartheeth_time = 3*dt
pressure_apply_time = 4*dt
if __name__=="__main__":
    analysis = simrev.ModelDevel("master")
    deck = Deck( )
    deck.units = "ENGLISH"
    deck.mechanics.max_num_mechanics_iters = "20"
    deck.contact_relocation_debug = ".TRUE."
    deck.mechanics.active_mechanics = "STRESS"
```

-continued

```
    deck.time_step.end_time = time
    deck.time_step.initial_time_step = 1e-5
    deck.time_step.max_num_time_steps = int(time/ float(dt))
    deck.time_step.time_step_selection = [[0,1e-5], [3e-5, 1e-5], [5e-5,
1e-3], [2e-3, 0.5]]
    deck.time_step.analysis_type="DYNAMIC"
    deck.stress_mechanics_solution = "BFGS"
    deck.stress_linesearch_flag = ".TRUE."
    deck.stress_beta = 0.5
    deck.stress_gamma = 0.9
    deck.thermal_residual_abs_tol = 5e200
    deck.thermal_increment_abs_tol = 1.0e-4
    deck.stress_residual_abs_tol = 5e20
    deck.stress_increment_abs_tol = 2.0
    deck.stress_iter_reform_interval = 5
    deck.sub.node_initial_field.initial_field_title = "'uniform initial
temp'"
    deck.sub.node_initial_field.initial_field_label = 1
    deck.sub.node_initial_field.initial_field_name = "TEMPERATURE"
    deck.sub.node_initial_field.uniform_field = 273.0
    deck.sub.use_exodus_file = True
    deck.wsmp_num_threads = 2
    analysis.trim_node_segment_contact = True
    batch = DiabloBatch(analysis, gres="lscratche",
path_prepend="deltic")
    batch.whichdiablo = "/usr/apps/mdg/bin/diablo.alpha"
    batch.walltime = "01:30:00"
    batch.nodes = 4
    batch.processes = 32
    batch.ntasks_per_node = 8
    analysis.set_batch(batch)
    analysis.deck = deck
    analysis.GuiLoad( )
```

AllPistons (a Single Part Inheriting From the simrev.Part Class) Follows in pistons.py

```
"""
The pistons are the most complicated part to mesh because
of the sideways throughholes in the "pin" connection.
# Important features:
Pressure on the piston head.
Friction in piston head contact interface.
Mesh size of the pistons. 0.02 cm gives 265k elements in pistons.
"""
from simrev.part import Part
from simrev.cubittools import * # This defines the "c" function as a call
to Cubit.
from simrev.material import material
from simrev.contact import thermal
from simrev.boundary import pressure
from simrev.boundary import temperature
from analysis_constants import max_num_uzawa_iters
from analysis_constants import default_iaug
from analysis_constants import default_slide_conductivity
from analysis_constants import stiff_stab_k
from analysis_constants import stiff_stab_m
piston_operating_pressure = 2000
recompress_pressure = 500
open_pressure = 30
friction_at_piston_head = 0.3
mesh_size = 0.03
class AllPistons(Part):
    def __init__(self):
        super(AllPistons, self).__init__( )
        from run_engine import pressure_apply_time, time
        from run_engine import pistonpin_time
        from run_engine import crankdrive_time
        piston_screen_dist = 5e-2
        # The material of the piston heads is defined
        mat = material("aluminum7075", copy=True)
        mat.add_name("piston_heads")
        mat.stiff_stab_m = stiff_stab_m
        mat.stiff_stab_k = stiff_stab_k
        #Pressure of combustion is defined
        pp = pressure("drive_piston_pressure")
        pp.add_name("drive_pressure_face")
```

-continued

```
        pp.load_curve = [[0,0], [time, 1]]
        pp.scale_factor = piston_operating_pressure
        pp = pressure("recompress_pressure_face")
        pp.load_curve = [[0,0], [time, 1]]
        pp.scale_factor = recompress_pressure
        pp = pressure("open_pressure_face")
        pp.load_curve = [[0,0], [time, 1]]
        pp.scale_factor = open_pressure
# Temperature applied to piston tops, add names here.
# Temperature value is applied in cylinders.py
        tmp = temperature("heat_of_combustion")
        tmp.add_name("drive_pressure_face")
        tmp.add_name("recompress_pressure_face")
        tmp.add_name("open_pressure_face")
# Pin interfaces
        tmp = thermal("pin_fixed")
        tmp.tied_flag = ".TRUE."
        tmp.h = default_slide_conductivity
        tmp.max_num_uzawa_iters = max_num_uzawa_iters
        tmp.contact_gap_tol = 2.0
# Sliding back and forth in cylinder
        tmp = thermal("piston_sliding")
        tmp.add_slave_name("outside_of_pistons")
        tmp.mu = friction_at_piston_head
        tmp.h = default_slide_conductivity
        tmp.augmented_lagrange_flag = default_iaug
        tmp.max_num_uzawa_iters = max_num_uzawa_iters
        tmp.relocation_type = 0
        tmp.contact_gap_tol = 2.0
    def import_cad(self):
        """
        CAD files are also version controlled
        """
        c("import acis './sat/pistons.sat' separate_bodies ")
        c("vol all name 'piston_heads'")
    def pin_rotation(self):
        c("surf 318 132 232 294 108 231 293 107 131 317 45 46 name 'pin_fixed_s'")
        surfs = [\
            313, 360, 127, 174, 227, 222, 289, 256, 322, 372, 186, 136, 236,
            248, 298, 310, 103, 98, 112, 124, 41, 36, 50, 62]
        surfstr = " ".join([str(surf) for surf in surfs])
        c("surf %s name 'outside_of_pistons'"%surfstr)
    def internal_glue(self):
        surfs = [\
            350, 355, 354, 349, 352, 359, 358, 351, 338, 367, 368, 339, 370,
            341, 340, 369, 181, 152, 155, 184, 182, 153, 154, 168, 163, 183,
            166, 173, 164, 165, 169, 172, 211, 216, 217, 212, 214, 221, 220,
            213, 245, 194, 193, 244, 195, 246, 192, 243, 305, 272, 275, 308,
            306, 273, 307, 274, 250, 283, 286, 255, 284, 251, 254, 285, 89,
            96, 93, 88, 92, 97, 90, 87, 78, 121, 120, 77, 76, 119, 122, 79,
            59, 16, 15, 17, 60, 58, 14, 57, 25, 30, 31, 26, 35, 28, 27, 34]
        surfstr = " ".join([str(surf) for surf in surfs])
        c("surf %s name 'pin_holder_m'"%surfstr)
        surfs = [\
            114, 101, 106, 109, 113, 102, 105, 111, 40, 51, 49, 52,
            47, 44, 39, 43, 324, 321, 315, 319, 323, 312, 311, 316,
            126, 137, 133, 130, 125, 138, 135, 129, 229, 235, 237,
            226, 238, 233, 230, 225, 288, 299, 292, 295, 300, 287,
            291, 297]
        surfstr = " ".join([str(surf) for surf in surfs])
        c("surf %s name 'pin_holder_s'"%surfstr)
# Between halves of pistons
        surfs = [\
            33, 20, 3, 22, 38, 357, 344, 331, 346, 362, 176, 160, 145, 158,
            171, 95, 82, 69, 84, 100, 253, 278, 265, 280, 258,
            206, 219,
            224, 208, 203]
        surfstr = " ".join([str(surf) for surf in surfs])
        c("surf %s name 'piston_lower_half'"%surfstr)
        surfs = [\
            366, 334, 327, 336, 365, 10, 56, 7, 12, 55, 72, 118, 65, 117, 74,
            150, 179, 141, 148, 180, 268, 304, 270, 303, 261, 188, 242, 190,
            241, 199]
        surfstr = " ".join([str(surf) for surf in surfs])
        c("surf %s name 'piston_upper_half'"%surfstr)
    def layer_glue(self):
        #c("vol all except vol in surf with name 'pin_fixed_s*' vis off")
        c("vol all vis on")
        surfs = [279, 207, 159, 345, 83, 21, 80, 276, 196, 156, 342, 18]
        surfstr = " ".join([str(surf) for surf in surfs])
        c("surf %s name 'layers_facing_out'"%surfstr)
        surfs = [239, 215, 177, 167, 353, 363, 53, 29, 301, 249, 115, 91]
        surfstr = " ".join([str(surf) for surf in surfs])
        c("surf %s name 'layers_facing_in'"%surfstr)
        c("surf 75 85 271 281 191 109 151 161 13 23 337 347 name 'piston_top_m'")
        c("surf 262 266 204 200 8 66 70 4 328 332 142 146 name 'piston_top_s'")
    def piston_pressure(self):
        c("surf 356 348 330 326 335 364 170 162 149 178 144 140 name 'drive_pressure_face'")
        c("surf 110 296 234 134 48 320 name 'arm_lateral_s'") # top side is master
        c("surf 42 314 128 228 290 104 name 'arm_lateral_s'")
    def mesh(self):
        c("del vol with z_coord<1.1 ")
        c("webcut volume 18 with sheet extended from surface 151 ")
        c("del vol 49 ")
        c("unite volume all ")
        c("separate body all")
        c("compress")
        c("webcut volume 3 with sheet extended from surface 61")
        c("webcut volume 7 with sheet extended from surface 47")
        c("webcut volume 3 7 with sheet extended from surface 18")
        c("imprint volume all ")
        c("merge volume all ")
        c("Volume 10 8 9 3 7 copy move x 1 y 0 z 0 repeat 5")
        c("compress")
        c("align Volume 13 surface 102 with surface 43 reverse include_merged ")
        c("align Volume 18 surface 128 with surface 8 reverse include_merged ")
        c("align Volume 23 surface 154 with surface 27 include_merged ")
        c("align Volume 28 surface 180 with surface 35 reverse include_merged ")
        c("align Volume 33 surface 206 with surface 16 include_merged ")
        c("delete Volume 6 1 2 5 4")
        c("move Volume 10 x 0 y 0 z .03058 include_merged")
        c("mesh vol all")
        c("Volume all copy reflect origin 0 0 1.102362 direction 0 0 1")
        c("merge volume all ")
        c("surf 193 349 167 323 141 297 83 239 89 245 271 115 name 'arm_lateral_s'")
        c("surf 343 346 187 190 330 174 304 317 320 161 164 148 rename 'recompress_pressure_face'")
        c("surf 291 294 278 135 138 122 200 216 213 369 372 356 rename 'open_pressure_face'")
# lower half is arm_lateral_s
    # upper half is arm_lateral_m
        c("surf 239 297 323 349 271 245 name 'arm_lateral_s'")
        c("surf 115 89 83 141 167 193 name 'arm_lateral_m'")
```

What is claimed is:

1. A computer-implemented tool for design of a physical object, comprising:
    a processor programmed to parse user-supplied instructions expressed as text statements according to a predefined syntax and grammar, into commands to generate computer model representations of parts to assist in carrying out a manufacturing activity related to manufacture of the physical object;

the processor being programmed to define a first interface to a graphical mesh creation tool that that expresses object geometry according to a predefined data model and that produces a graphical rendering of an object in accordance with the data model;

the processor being programmed to define a second interface to a computer-implemented analysis system of the type that responds to predefined analysis code instructions and that generates simulations producing simulation outputs stored in a file system associated with the analysis system, where the simulation outputs relate to simulations performed for different versions of the physical object;

the processor being programmed to define a third interface to a computer-implemented version control repository system;

wherein the processor is programmed to translate at least one of the parsed user-supplied instructions into a physical object geometry specification expressed using the data model;

wherein the processor is programmed (a) to translate at least one of the parsed user-supplied instructions into designated analysis code instructions, (b) to submit the designated analysis code instructions to the analysis system as a job to be run on the analysis system and (c) to cause the file system associated with the analysis system to allocate a file on said file system in which to store output of an analysis performed by the analysis system using the designated analysis code;

wherein the processor is programmed to cause the version control repository system to capture changes to states of;

the user-supplied instructions, the text statements in the predefined syntax and grammar including code, binary object geometry, and analysis code instructions;

for each one of the plurality of simulations performed, and to generate a unique identifier code formed by a hash of the user-supplied instructions, the text statements, the binary object geometry and the analysis code instructions, and wherein the hash is associated to each one of the plurality of simulations performed, and to associate each of the identifiers with the allocated file associated with each said simulation on the file system associated with the analysis system.

2. The tool of claim 1 wherein the processor is further programmed with a fourth interface to a computer aided design system and to receive physical object geometry data from the computer aided design system.

3. The tool of claim 1 wherein the text statements are expressed using an object-oriented text-based computer programming language.

4. The tool of claim 1 wherein version control repository system is associated with a repository file system, and wherein the processor is programmed to capture the state of the user-supplied instructions by causing the version control repository system to store the user-supplied instructions in the repository file system.

5. The tool of claim 1 wherein the processor is programmed to verify the integrity of the user-supplied instructions and track a responsible party and decision date when a geometry change, analysis specification, or material of construction was changed.

6. The tool of claim 1 wherein the processor is programmed to translate parsed user-supplied instructions into analysis code instructions that are selectively expressed in one of a plurality of different grammars corresponding to different types of analysis systems.

7. The tool of claim 2 wherein the processor is programmed to ingest product design constrains supplied as at least one of the user-supplied instructions and the physical object geometry data.

8. The tool of claim 1 wherein the processor is programmed to translate product design constraints that specify at least one of materials, boundary conditions and contact interfaces into analysis code and according to the predefined data model.

9. The tool of claim 1 wherein the processor is programmed to facilitate consistent syntax and grammar among a series of material and part suppliers, such that multiple users representing counterparties may verify trusted contributor status of the counterparties.

10. The tool of claim 1 wherein the processor is programmed to facilitate the re-ingestion of testing and surveillance of the manufacturing activity, as quality control and verification of computational analysis tools.

11. The tool of claim 1 wherein the processor is programmed for a common syntax and grammar that is supportive of various computer implemented analysis systems and graphical mesh creation tools for expression of object geometry.

12. A computer-implemented tool for design and optimization of a physical object, comprising:

a processor programmed to parse user-supplied instructions expressed as text statements according to a predefined syntax and grammar, into commands to generate computer model representations of parts;

the processor being programmed to define an interface to a computer-implemented analysis system of the type that responds to predefined analysis code instructions and that generates simulations producing simulation outputs stored in a file system associated with the analysis system, where the simulation outputs relate to simulations performed for different versions of the physical object;

wherein the processor is programmed to translate at least one of the parsed user-supplied instructions into a physical object geometry specification expressed using a data model;

wherein the processor is programmed (a) to translate at least one of the parsed user-supplied instructions into designated analysis code instructions, (b) to submit the designated analysis code instructions to the analysis system as a job to be run on the analysis system and (c) to cause the file system associated with the analysis system to allocate a file on said file system in which to store the simulation outputs of an analyses performed by the analysis system using the designated analysis code; and a version repository control system;

wherein the processor is programmed to cause the version control repository system to capture changes to states of;

the user-supplied instructions, the text statements in the predefined syntax and grammar including code, binary object geometry, and analysis code instructions;

for each one of the plurality of simulations performed, and to generate a unique identifier code formed by a hash of the user-supplied instructions, the text statements, the binary object geometry and the analysis code instructions, and wherein the hash is associated to each one of the plurality of simulations performed, and to associate each of the identifiers with the allocated file associated with each said simulation on the file system associated with the analysis system.

13. The computer implemented tool of claim 12 wherein the processor is programmed to generate and supply manufacturing control system instructions based on the physical object geometry expressed using the data model to an automated manufacturing system which manufactures the physical object.

14. The computer implemented tool of claim 13 wherein the automated manufacturing system is an additive manufacturing system.

15. The computer implemented tool of claim 11 wherein the processor includes a user interface through which a plurality of users submit user-supplied instructions and wherein at least one of the graphical mesh creation tools, and the version control repository system are accessible to said plurality of users thereby facilitating group collaboration among said plurality of users.

16. The computer implemented tool of claim 13 wherein the processor includes a user interface through which a plurality of users submit user-supplied instructions and wherein at least one of a plurality of graphical mesh creation tools, and the version control repository system are accessible to said plurality of users thereby facilitating group collaboration among said plurality of users.

17. A method for manufacturing physical object comprising:
providing a processor programmed to parse user-supplied instructions relating to manufacture of a physical object, and expressed as text statements according to a predefined syntax and grammar, into computer commands to generate computer model representations of parts;
the processor being programmed to define an interface to a computer-implemented version control repository system;
wherein the processor is programmed to translate and store in a non-transitory computer readable medium at least one of the parsed user-supplied instructions into a physical object geometry specification the physical object geometry specification being used to help manufacture the physical object; and
wherein the processor operates to cause the version control repository system to capture changes to states of;
the user-supplied instructions,
the text statements in the predefined syntax and grammar including code,
binary object geometry, and
analysis code instructions;
for each one of a plurality of simulations performed using the method, and
to generate a unique identifier code formed by a hash of the user-supplied instructions, the text statements, the binary object geometry and the analysis code instructions, and wherein the hash is associated to each one of the plurality of simulations performed, and to associate each of the identifiers with an allocated file associated with each said simulation on a file system.

18. The method of claim 17 further comprising using the processor to generate manufacture control system instructions and associating the hash of the user-supplied instructions with the manufacture control system instructions.

19. The method of claim 18 wherein the manufacture control system instructions are used to control an additive manufacturing process.

* * * * *